April 26, 1927.

B. H. KRAFFT 1,626,200

STORAGE BATTERY GRID PASTING MACHINE

Filed May 14, 1926

INVENTOR:
Bert H. Krafft
By Geo. K. Woodworth
ATTORNEYS:

April 26, 1927.
B. H. KRAFFT
1,626,200
STORAGE BATTERY GRID PASTING MACHINE
Filed May 14, 1926 6 Sheets-Sheet 2
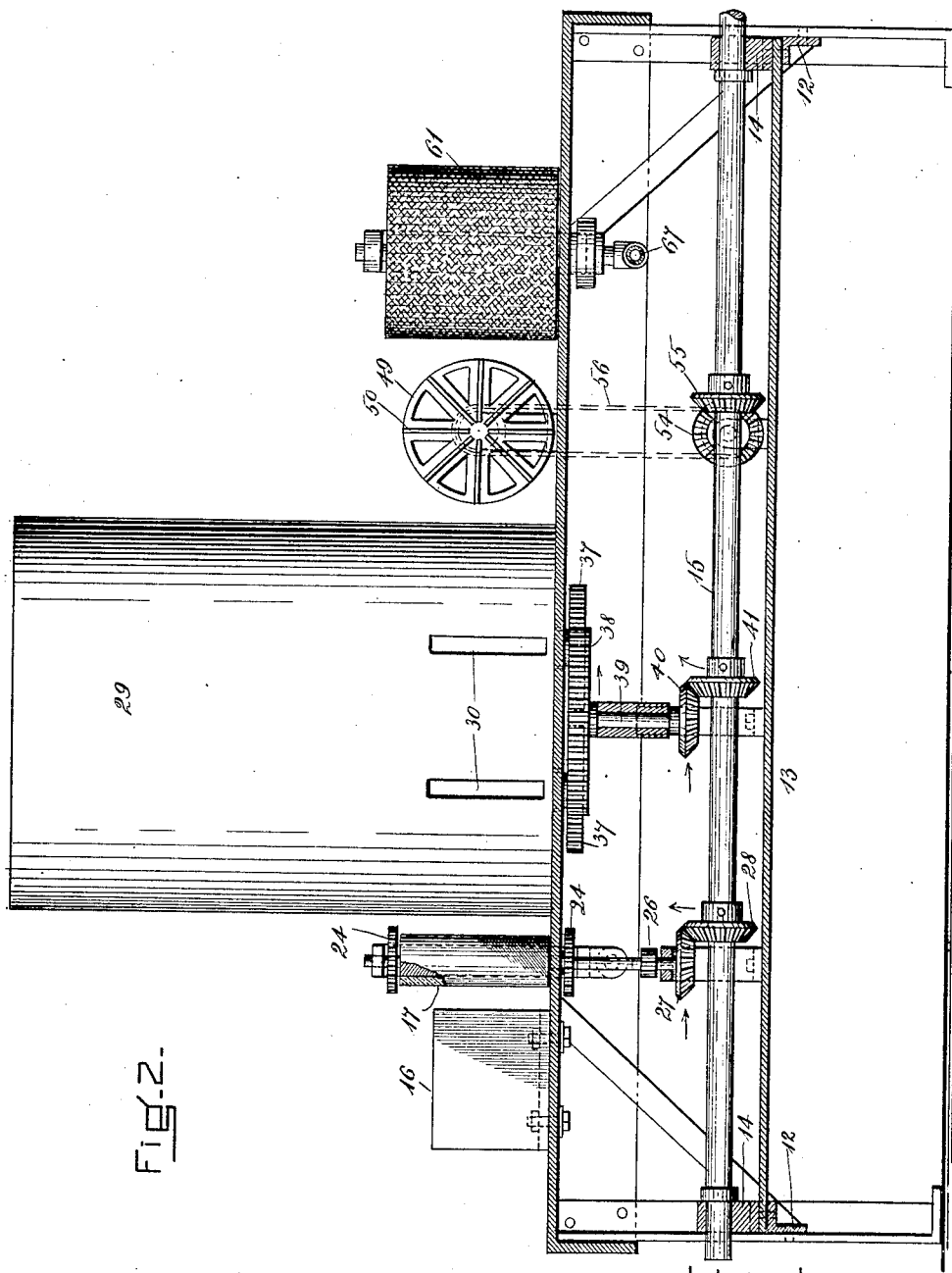

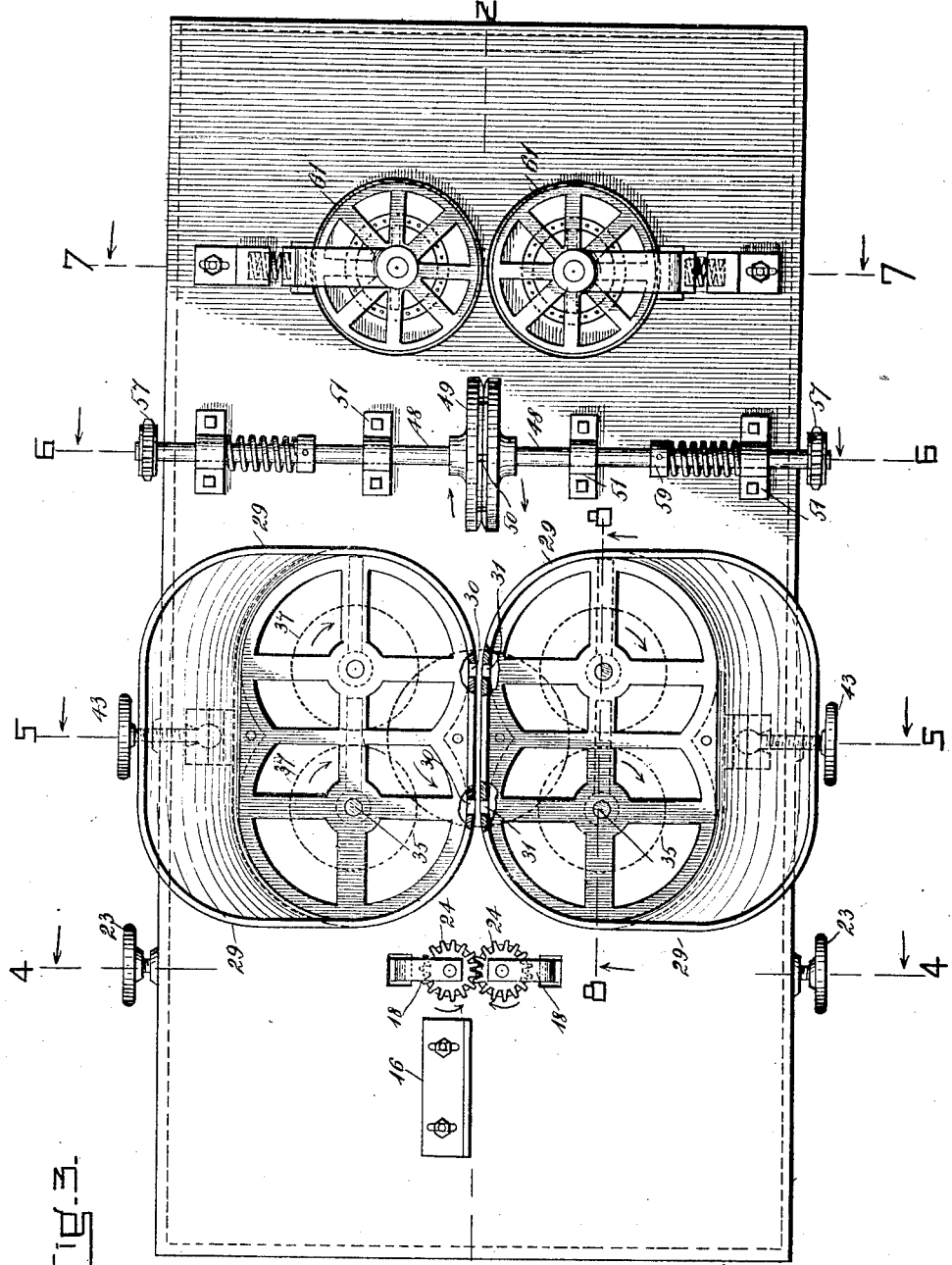

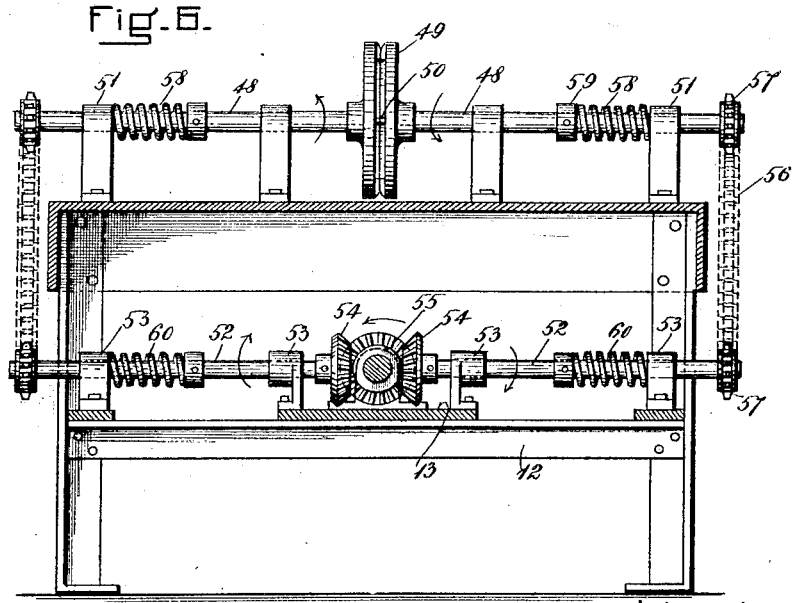

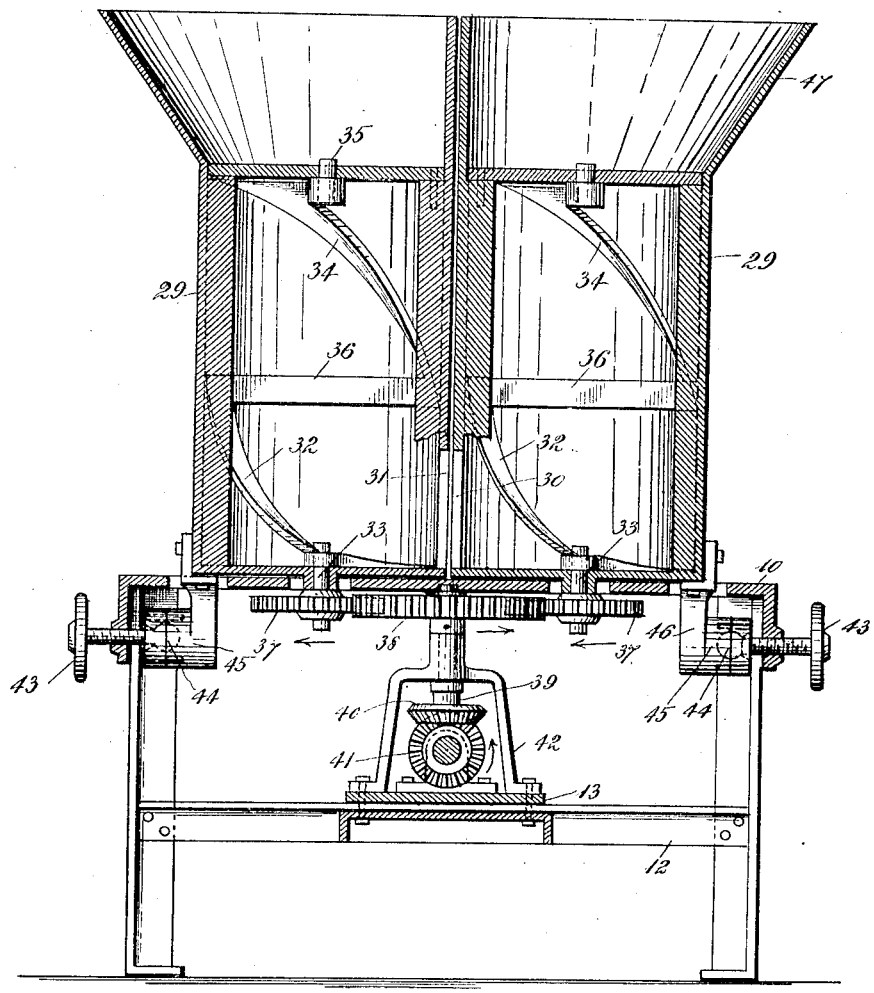

April 26, 1927.
B. H. KRAFFT
1,626,200
STORAGE BATTERY GRID PASTING MACHINE
Filed May 14, 1926          6 Sheets-Sheet 6
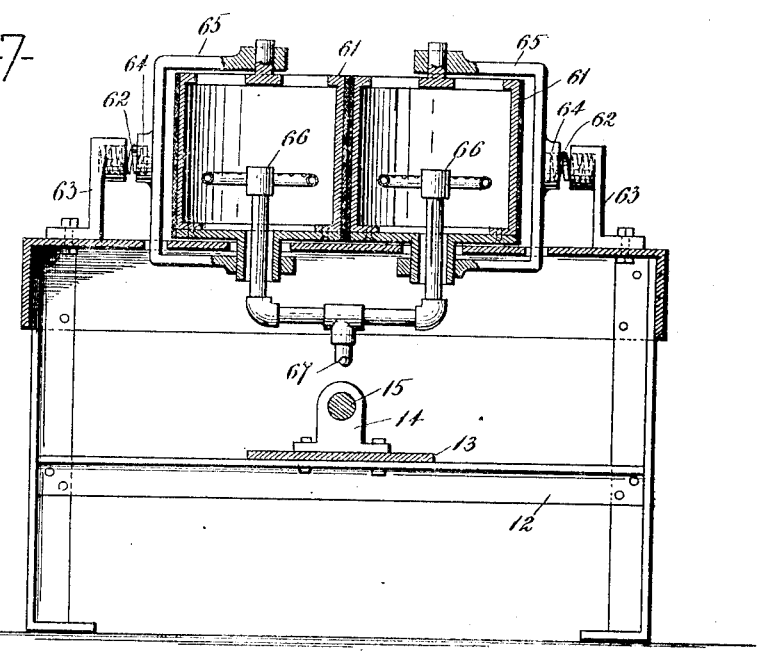
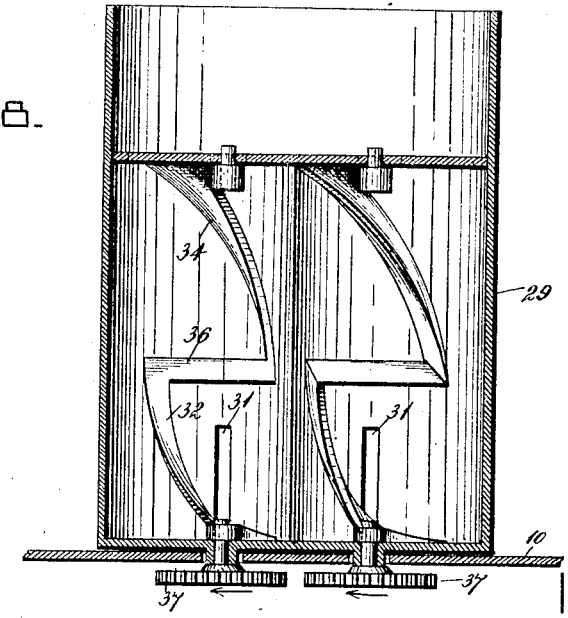
INVENTOR:
Bert H. Krafft
By Geo. K. Woodworth
ATTORNEY Patented Apr. 26, 1927.

1,626,200

UNITED STATES PATENT OFFICE.

BERT H. KRAFFT, OF CAMBRIDGE, MASSACHUSETTS, ASSIGNOR, BY MESNE ASSIGNMENTS, TO SAMUEL H. BOROFSKY, OF BROOKLYN, NEW YORK.

STORAGE-BATTERY GRID-PASTING MACHINE.

Application filed May 14, 1926. Serial No. 109,117.

My invention relates to machines for automatically pasting the grids of storage batteries and the object of my invention is to improve and simplify the construction of such machines and increase the efficiency thereof in the manner hereinafter more fully set forth.

In the drawings which accompany and form a part of this specification—

Fig. 2 is a vertical longitudinal section taken on the line 2—2 of Fig. 3;

Fig. 3 is a plan view, certain parts being shown in section;

Figure 1:
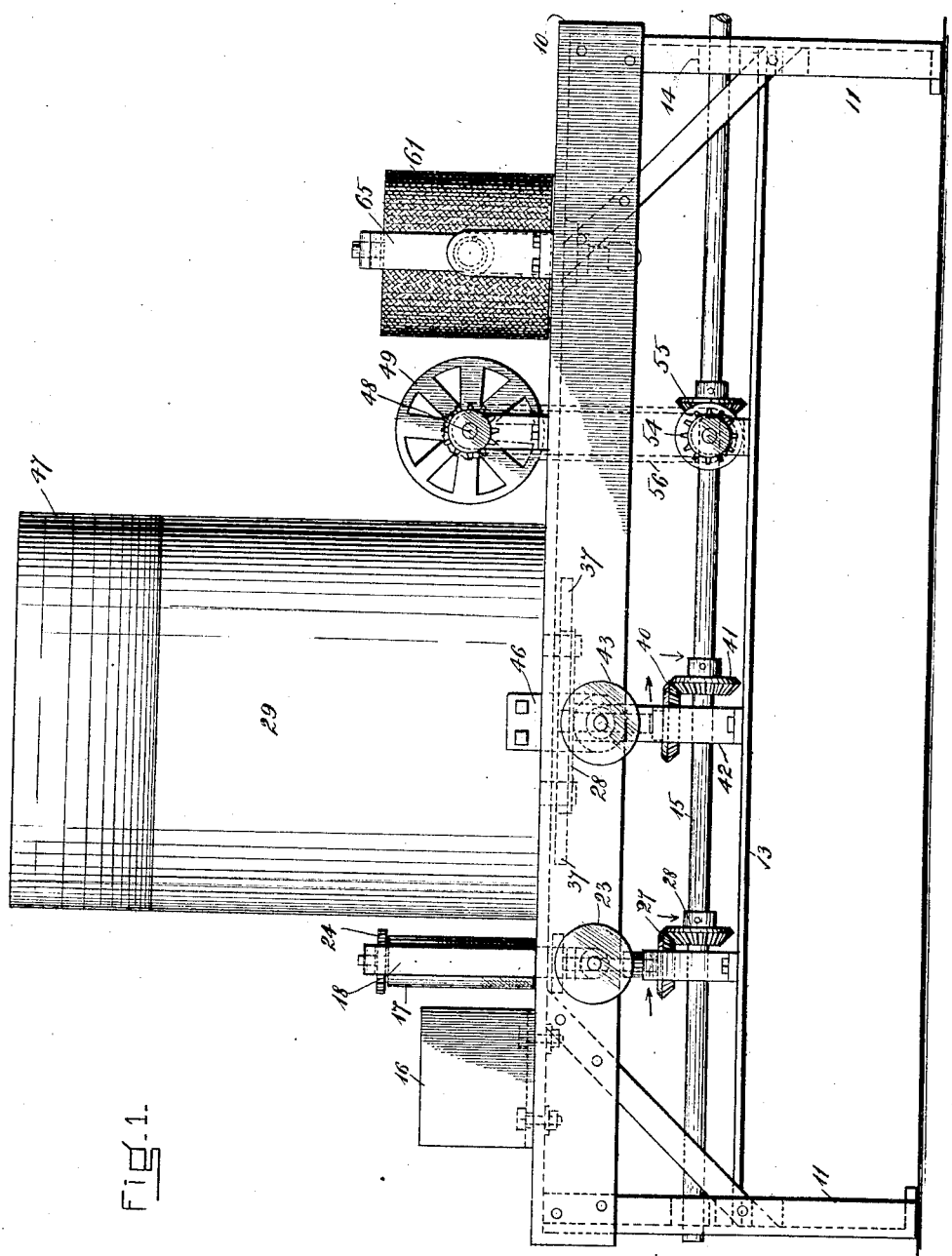
Figure 1 is a side elevation of a storage battery grid-pasting machine embodying my invention.

Figs. 4, 5, 6, 7 and 8 are vertical sections taken on the lines 4—4, 5—5, 6—6, 7—7 and 8—8, respectively, of Fig. 3.

In the particular drawings selected for more fully disclosing the principle of my invention and which are to be considered as illustrative rather than restrictive, 10 is a base-plate supported by the legs 11 carrying the transverse angle plates 12 which in turn support the longitudinal plate 13 carrying the bearings 14 for the central longitudinal shaft 15 arranged to be rotated by means not shown in a counter-clockwise direction from the standpoint of an observer viewing the machine from the rearward end thereof.

Mounted on the base is a transversely adjustable guide plate 16 for positioning a grid preparatory to its entrance between the rollers 17, 17 rotatably mounted in the transversely adjustable frames 18, 18 carried by the sleeves 19, 19 which are arranged on the inner ends of the threaded rods 20, 20 and restrained from longitudinal movement with respect thereto by the washers 21, 21 rigidly attached to said rods by set-screws 22. Each rod 20 terminates in a hand-wheel 23 and is in threaded engagement with the flanges of the base 10, so that by manipulating said hand-wheels, the separation between the rollers may be slightly varied without disengagement of the spur gears 24, 24 whereby the rotation of the roller mounted on the vertical shaft 25 is communicated to the other roller. The said shaft 25 is connected by gearing 26 to the bevel-gear 27 meshing with the bevel-gear 28 secured to the shaft 15. Located forwardly of the roller 17 are a pair of oppositely-disposed paste receptacles 29, 29 separated for the passage of a grid therebetween and having registering paste outlets 30, 30 and 31, 31, respectively. Rotatably mounted within said receptacles are a pair of members for mixing the paste and forcing the same through said outlets, each said member having an arm 32 curving upwardly and outwardly from its lower bearing 33, and a second arm 34 curving downwardly and outwardly from its upper point of support 35, the outer ends of said curved arms being joined by the substantially horizontal arm 36. By suitable gearing of any type the arms are rotated by the shaft 15, and in the present instance spur-gears 37, 37 secured to studs 33, mesh with the central gear 38 attached to the vertical shaft 39, carrying the bevel-gear 40 which meshes with the bevel gear 41 on said shaft 15, said vertical shaft 39 having its bearing in the standard 42 carried by the longitudinal plate 13.

Any suitable means, such as the handwheels 43, may be employed to vary the separation between the paste receptacles 29, said hand-wheels being shown in the present instance as threaded into the depending flanges of the base-plate 10 and having universal-joint connections 44 with sockets 45 secured to the paste receptacles by the depending lugs 46.

It will be obvious that as the arms 32 are rotated, the paste will be forced thereby through the outlets 30, 31 and into the interstices of the grid which is passing through the space between the paste receptacles.

It will be noted that the positions of the arms 32, 32 may be so arranged as to vary the density of the pasted grid. Thus for example, when said arms have the positions shown in Fig. 5, the righthand arm 32 will force the paste into the grid and a portion thereof will pass therethrough and into the lefthand receptacle by way of the outlet 31; but when the gears 37 are so adjusted with respect to the central gear 38 that the lefthand arm 32 has a position 180° from that shown in Fig. 5, the paste in the lefthand grid in the vicinity of the outlet 31 will be under pressure, as will the paste in the righthand receptacle in the vicinity of the outlet 30, so that the two arms 32 in this instance co-operate to give the pasted grid a maximum density.

By arranging the lefthand gear 37 with respect to its intermeshing gear 38 so that the lefthand arm 32 will have positions intermediate that shown in Fig. 5, and the position above described, viz., 180° from the Fig. 5 position, the density of the pasted grid may be varied at will.

Preferably the upper ends of the paste receptacles flare outwardly as shown at 47 to facilitate the filling of the same with paste.

While two co-operating sets of blades in each receptacle are preferable, because thereby the paste is mixed and kneaded by the same means which forced the same through the outlets, it will be obvious that only one such set, co-operating with a single opening, may be used.

Arranged in line with the space between the pasting receptacles is a means for removing the surplus paste from each grid after its passage through said space, and in the present instance said means consists of a pair of co-axial shafts 48, 48 rotating in opposite directions and carrying on their inner ends spring-pressed wiping members herein shown as discs 49 carrying radial spokes 50 arranged to co-operate with the two faces of the grid as it passes between said discs. The shafts 48, 48 are mounted in the standards 51, 51 and motion is communicated to them by the shafts 52, 52 journalled in the bearings 53, 53 and carrying bevel-gears 54, 54 meshing with the bevel-gears 55 on the main shaft 15, the shafts 52, 52 being connected with the shafts 48, 48 in any suitable manner as for instance, by means of the chains 56 and sprockets 57. The pressure exerted on the two faces of the grid is regulated by the springs 58, 58 interposed between the outer bearings 51 and collars 59 rigidly connected to the shafts 48. Similar springs 60 are provided for the lower shafts 52 to enable the latter to accommodate themselves to the relative positions of the shafts 48.

Means are provided for removing the surplus moisture from the pasted grid and for giving the same a suitable finish, said means consisting in the present instance of a pair of fabric covered rollers 61, 61 tangential at a point in line with the space between the paste receptacles, the said rollers being pressed together by the springs 62, 62 mounted in the brackets 63, 63 and co-operating with the sockets 64, 64 arranged on the brackets 65, 65 in which said rollers are rotatably mounted. Preferably means are provided for heating the rollers such as the gas heaters 66 arranged inside the same and connected with a source of gas by the pipe 67.

The operation is as follows:—

Assuming that the paste receptacles are filled with lead oxid or other suitable paste for storage battery grids, a grid is placed by hand alongside the guide 16 and pushed forward until it is engaged by the rollers 17, 17 which grip the same and drive it forwardly through the space between the paste receptacles, whereupon during its passage through said space its interstices are filled with paste at the proper density which is forced through the outlets 30, 31. As soon as the grid leaves the rollers 17, 17, another grid is placed alongside the guide 16 and inserted between said rollers, so that longitudinal movement is imparted to the first grid by the second, and so on all the way through the machine, a continuous chain of grids passing therethrough and motion being communicated to them at all times by the grid which is being acted upon by said rollers 18, 18.

After leaving the space between the paste receptacles each grid passes successively between the wiping discs 49 and the drying and finishing rollers 61, the surplus paste being removed by the former and the pasted grid being dried and finished by the latter.

Having thus described an illustrative embodiment of my invention without however limiting the same thereto, what I claim and desire to secure by Letters Patent is:—

1. A storage-battery grid-pasting machine comprising in combination two oppositely-disposed paste receptacles, said receptacles being separated for the passage of a grid therebetween and having registering paste outlets, and a member rotatably mounted in each receptacle for forcing the paste through said outlets, said members each having an arm curving upwardly and outwardly from its lower point of support on said receptacle to the wall thereof.

2. A storage-battery grid-pasting machine comprising in combination two oppositely-disposed paste receptacles, said receptacles being separated for the passage of a grid therebetween and having registering paste outlets, and a member rotatably mounted in each receptacle for forcing the paste through said outlets, said members each having an arm curving upwardly and outwardly from its lower point of support on said receptacle to the wall thereof, a second arm curving downwardly and outwardly from its upper point of support on said receptacle to the wall thereof, and a cross arm joining the outer ends of said curved arms.

3. A storage-battery grid-pasting machine comprising in combination two oppositely-disposed vertically arranged paste receptacles, the side walls of said receptacles being separated for the passage of a grid therebetween and having registering paste outlets, and a member rotatably mounted in each receptacle for forcing the paste through said outlets, the said members being mutually adjustable axially for co-operation whereby to vary the density of the pasted grid.

4. A storage-battery grid-pasting machine comprising in combination two oppositely-disposed paste receptacles separated for the passage of a grid therebetween and having registering paste outlets, means rotatably mounted in each receptacle for forcing paste through said outlets, a pair of fabric covered rollers tangential at a point in line with the space between said receptacles and resilient means for pressing said rollers against the respective faces of the pasted grid during its passage therebetween.

5. A storage-battery grid-pasting machine comprising in combination two oppositely-disposed paste receptacles separated for the passage of a grid therebetween and having registering paste outlets, means rotatably mounted in each receptacle for forcing paste through said outlets, a pair of fabric covered rollers constructed and arranged to permit the pasted grid to pass therebetween, and means for heating said rollers.

In testimony whereof, I have hereunto subscribed my name this tenth day of May, 1926.

BERT H. KRAFFT.